United States Patent
Haglund et al.

(10) Patent No.: US 7,344,190 B2
(45) Date of Patent: Mar. 18, 2008

(54) VEHICLE SEAT

(75) Inventors: Lennart Haglund, Vårgårda (SE); Lennart Simonsson, Vårgårda (SE); Alf Holgers, Allngsäs (SE)

(73) Assignee: Autoliv Development AB, Vargarda (SE)

( * ) Notice: Subject to any disclaimer, the term of this patent is extended or adjusted under 35 U.S.C. 154(b) by 72 days.

(21) Appl. No.: 10/562,983

(22) PCT Filed: Jun. 14, 2004

(86) PCT No.: PCT/SE2004/000929

§ 371 (c)(1),
(2), (4) Date: Jun. 13, 2006

(87) PCT Pub. No.: WO2004/113117

PCT Pub. Date: Dec. 29, 2004

(65) Prior Publication Data

US 2007/0096514 A1 May 3, 2007

(30) Foreign Application Priority Data

Jun. 24, 2003 (GB) ................................. 0314710.5

(51) Int. Cl.
*B60N 2/42* (2006.01)
*B60R 21/00* (2006.01)
(52) U.S. Cl. ................................ 297/216.12
(58) Field of Classification Search ........... 297/216.12, 297/408, 410, 216.1
See application file for complete search history.

(56) References Cited

U.S. PATENT DOCUMENTS

| | | | |
|---|---|---|---|
| 2,973,029 A * | 2/1961 | Schlosstein | 297/216.12 |
| 5,738,412 A | 4/1998 | Aufrere et al. | |
| 5,795,019 A | 8/1998 | Wieclawski | |
| 5,927,804 A | 7/1999 | Cuevas | |
| 6,019,424 A | 2/2000 | Rückert | |
| 6,024,406 A | 2/2000 | Charras et al. | |
| 6,062,642 A | 5/2000 | Sinnhuber et al. | |
| 6,149,232 A | 11/2000 | Meyer | |
| 6,199,947 B1 | 3/2001 | Wiklund | |
| 6,604,788 B1 | 8/2003 | Humer | |
| 6,607,242 B2 * | 8/2003 | Estrada et al. | 297/216.12 |
| 6,789,846 B2 * | 9/2004 | Humer et al. | 297/216.12 |
| 6,890,029 B2 * | 5/2005 | Svantesson | 297/216.12 |
| 2003/0001414 A1 | 1/2003 | Humer et al. | |

FOREIGN PATENT DOCUMENTS

| | | |
|---|---|---|
| DE | 10022441 | 7/2001 |
| EP | 1077155 A1 | 2/2001 |
| GB | 2373177 | 9/2002 |
| JP | 10181403 | 7/1998 |
| JP | 10262776 | 10/1998 |
| WO | WO 03/006275 A1 | 1/2003 |

* cited by examiner

*Primary Examiner*—David Dunn
*Assistant Examiner*—Kaitlin A Wilson
(74) *Attorney, Agent, or Firm*—Brinks Hofer Gilson & Lione

(57) ABSTRACT

A vehicle seat is provided with a squab, backrest and a headrest. The headrest is supported by one or more support elements. Each support element is connected by a connection to a respective drive element which is connected to a pressure plate located within the backrest. The drive element is guided for rearward movement by a guide which is formed fast with the frame of the seat. A pivot surface is provided located adjacent the support element such that, on rearward movement of the drive element, the support element engages the pivot surface to cause the headrest to move forwardly in a pivotal manner.

12 Claims, 4 Drawing Sheets

VEHICLE SEAT

CROSS REFERENCE TO RELATED APPLICATIONS

This application claims priority to Great Britain patent application 0314710.5, filed Jun. 24, 2003 and PCT/SE2004/000929, Filed Jun. 14, 2004.

FIELD OF THE INVENTION

The present invention relates to a vehicle seat and more particularly relates to a vehicle seat provided with a headrest arrangement intended to provide protection for the occupant of the seat in the event of a rear impact.

BACKGROUND OF THE INVENTION

If a vehicle is involved in a rear impact, for example the vehicle is struck from behind, the chassis of the vehicle is given a very sudden forward acceleration. The squab of a seat mounted in the vehicle and also the back rest of the seat will, consequently, move with a very swift acceleration, thus imparting the same acceleration to the buttocks and torso of an occupant of the seat.

However the head of the occupant, which has a substantial mass, is not contacted by any part of the seat and will thus remain stationary. Consequently the thorax of the seat occupant will move forwardly, whilst the head remains stationary, initially distorting the neck of the seat occupant. Subsequently, an acceleration will be imparted to the head of the occupant, by the occupant's neck, the acceleration initially being a rotational acceleration about the centre of gravity of the head, and subsequently being a forward acceleration that will accelerate the entire head of the seat occupant forward. This may impart substantial stress to the neck of the seat occupant giving rise to so called "whiplash" injuries.

Various proposals have been made to provide a headrest which, in response to a rear impact, moves forward so as to engage the rear part of the head of the seat occupant. Provided that the headrest moves forward sufficiently early during a rear impact situation, the head of the occupant may be engaged in such a way that it is given an acceleration which is virtually identical to the acceleration imparted to the buttocks and thorax of the seat occupant. In this way the head of the occupant will move almost simultaneously with the torso, and thus only a minimum distortion of the neck will occur, thereby reducing the likelihood of serious "whiplash" injuries.

It has been proposed to provide a headrest on a vehicle seat, the headrest being pivotally mounted in position and being associated with a pressure plate located in the backrest of the seat, so that if the torso of the seat occupant is driven rearwardly into the backrest, the pressure plate moves rearwardly causing the pivotally mounted headrest to move forwardly into engagement with the back of the head of the seat occupant.

Typically such prior arrangements are relatively complex, and, in many cases a pivot bearing is provided.

In view of the above, it is apparent that there exists a need for an improved vehicle seat.

SUMMARY OF THE INVENTION

In satisfying the above need, as well as overcoming the enumerated drawbacks and limitations of the related art, the present invention provides a vehicle seat provided with a squab, a backrest and a headrest. The headrest is supported by a support element connected by a connection to a drive element, and the drive element is connected to a pressure plate within the backrest and guided for rearward movement by a guide fast with the frame of the seat. Finally, a pivot surface is located adjacent the support element such that on rearward movement of the drive element the support element engages the pivot surface to cause the headrest to pivot forwardly.

Preferably, a stop element is provided located in front of part of the support element to restrict forward movement of the headrest.

Advantageously, a resilient biasing member is provided to bias the headrest to an initial position.

Conveniently, the pivot surface is convex.

Preferably, the pivot surface is concave.

Advantageously, the support element is provided with a convex part corresponding to the concave pivot surface, the convex part being received within the concavity of the convex pivot surface.

Conveniently, the connection between the drive element and the support element is a stud and aperture connection.

Preferably, the drive element, the connection, and the support element are formed integrally.

Advantageously, the drive element, the connection and the support element are all formed from a single metal bar.

Conveniently, means are provided to prevent rearward movement of the headrest following a forward pivotal movement of the headrest.

Preferably, the means to prevent rearward movement comprise a ratchet arrangement co-operating with the drive element.

Advantageously, at least one further drive element, connection and support element are provided associated with the headrest.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
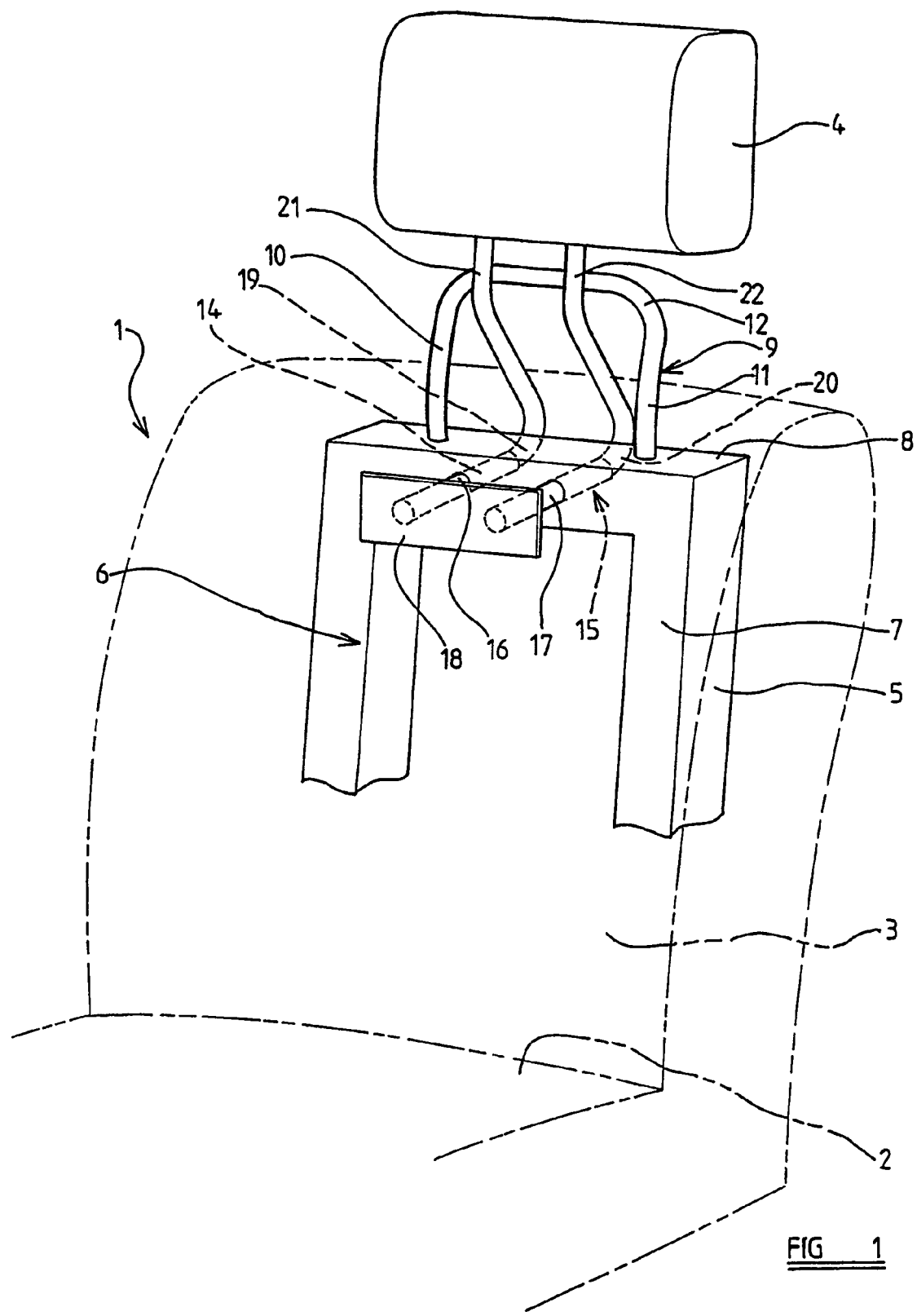
FIG. 1 is a perspective view of a vehicle seat, parts of the seat being shown in phantom and parts being shown cut away.

Referring initially to FIG. 1, a vehicle seat 1 is illustrated which has a squab 2 (shown in phantom) and a backrest 3 (also shown in phantom).

Associated with the backrest 3 is a headrest 4, the headrest 4 being illustrated at an initial position above the upper part of the backrest 3.

Within the backrest 3 of the seat, there is provided an inverted U-shaped seat frame 5. Inverted U-shaped seat frames are typical for front seats of a motor vehicle, but can also be provided within the rear seats. The frame 5 has two upwardly extending side arms 6, 7 interconnected by a substantially horizontal upper cross piece 8. The arms 6, 7 and the cross piece 8 may all be formed of hollow square or rectangular sectioned metal tubing.

Figure 2:
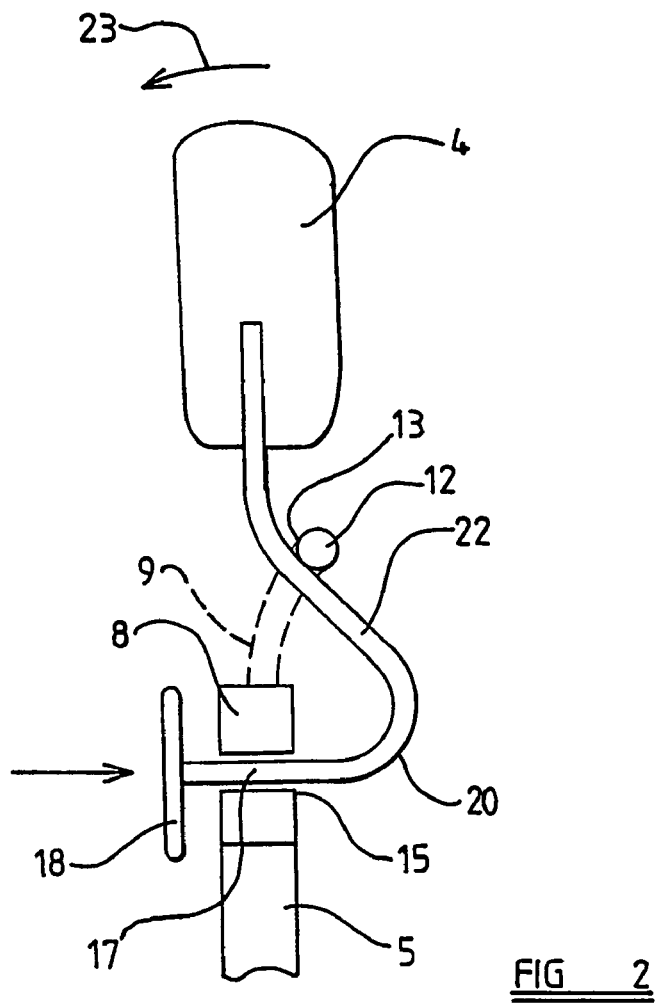
FIG. 2 is a schematic side part sectional view of part of the seat shown in FIG. 1.

Mounted on the cross piece 8 is a inverted U-shaped blocking member 9, the blocking member 9 having two arms 10, 11 extending generally upwardly from the cross piece. The two arms 10, 11 are interconnected by a base 12. The blocking member 9 is a formed of a rod or tube of circular cross section and the forwardmost face of the base 12 forms (as will become clearer from the following description) a convex pivot surface 13 (FIG. 2). As illustrated in FIG. 2, the two arms 10, 11 of the blocking member 9 are slightly arcuate such that the base 12 and the associated pivot surface 13 are located slightly rearwardly of the frame 5.

Returning to FIG. 1, the cross piece 8 of the frame 5 includes two spaced apart guide passages 14, 15 of circular section. The guide passages 14, 15 extend in the forward-rearward direction of the seat.

The guide passages 14, 15 receive respective drive elements 16, 17, the forwardmost ends of the drive elements 16, 17 supporting a pressure plate 18 which is located within the backrest 3 of the seat 1.

It will be understood that pressure applied to the pressure plate 18, by the torso of an occupant of the seat in a rear impact situation, will tend to move the drive elements 16, 17, and such movement will be guided to be a rearward movement by the guide passages 14, 15.

The drive elements 16, 17 pass through the guide passages 14, 15 to the rearside of the frame 5, where the drive elements 16, 17 are connected, by connections 19, 20 to the lower ends of two support elements 21, 22 which extend generally upwardly, past the base 12 of the blocking member 9, to engage and support the headrest 4.

It is to be noted that in the described embodiment the drive element 17, the connection 20 and the support element 22 are all formed integrally as a bent metal rod. The connection 20 is formed by a bent region of the rod and, as described below, this region of the rod will be deformed in a rear impact situation. Similarly, the other drive element 16, connection 19 and support element 21 are all formed integrally in the same manner. Alternatively, the connections 19, 20 can take the form of hinges.

If the seat 1 as described with reference to FIGS. 1 and 2 is occupied by a seat occupant, and the vehicle, in which the seat is mounted, is involved in a rear impact, the squab 2 and backrest 3 of the seat will move forwardly, thus imparting a sudden acceleration to the buttocks and torso of the seat occupant. The torso of the seat occupant will exert a reactionary force on the pressure plate 18, tending to move the pressure plate 18 rearwardly, towards the frame 5 within the backrest 3 of the seat. As the pressure plate 18 moves rearwardly, so the drive elements 16, 17 are also moved rearwardly, relative to the backrest of the seat. The drive elements 16, 17 are guided in their rearward movement by the guide passages 14, 15.

As the drive elements 16, 17 move rearwardly as described above, so the associated support elements 21, 22 are driven rearwardly until contact is established between each support element 21, 22 with the convex pivot surface 13 provided on the base 12 of the blocking member 9. Further rearward movement of the drive elements 16, 17 will cause the headrest 4 to pivot forwardly, as indicated by the arrow 23 in FIG. 2, thus bringing the headrest 4 into engagement with the rear part of the seat occupant's head. It is believed that this will minimize any risk of whiplash injuries occurring to the seat occupant.

The support elements 21, 22 can be configured so as to perform a energy absorption function in the event of an accident. As the head of the seat occupant is urged against the headrest 4, the support elements 21, 22 can deform, thereby absorbing energy and further reducing the risk of injury.

Figure 3:
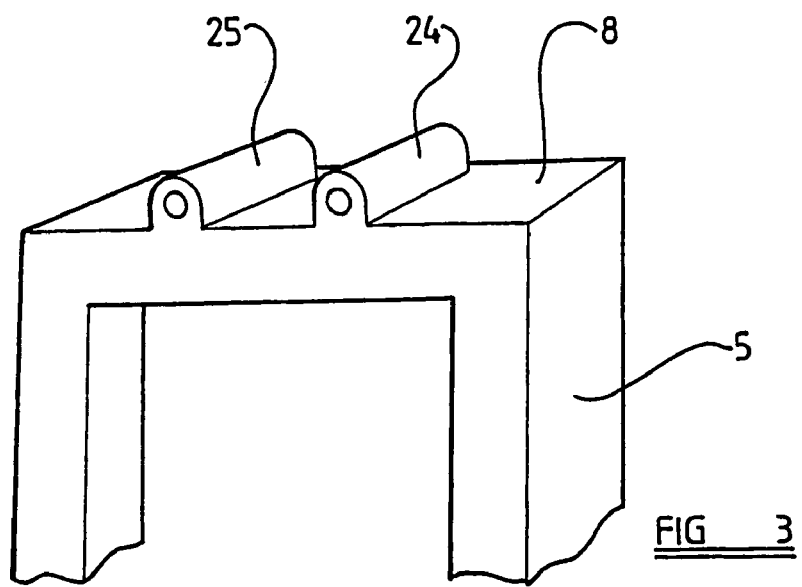
FIG. 3 is a perspective of part view of an alternative form of seat frame for use in another embodiment of the invention.

FIG. 3 illustrates a modified form of the frame 5 in which two tubular guide elements 24, 25 are secured to the cross piece 8 of the frame. The tubular guide elements 24, 25 each define a passage corresponding to the guide passages 14, 15 of the embodiment described with reference to FIGS. 1 and 2. It should therefore be appreciated that in both of the above described embodiments, the guide passages are fast with the frame.

Figure 4:
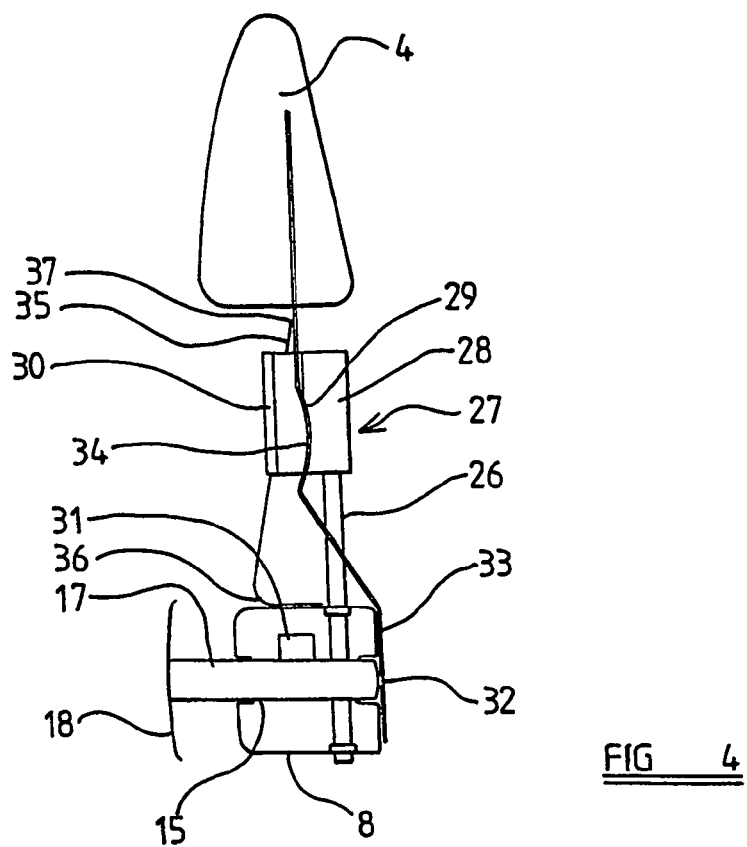
FIG. 4 is a diagrammatic sectional view corresponding generally to FIG. 2 illustrating a modified embodiment of the invention in an initial position.
Figure 5:
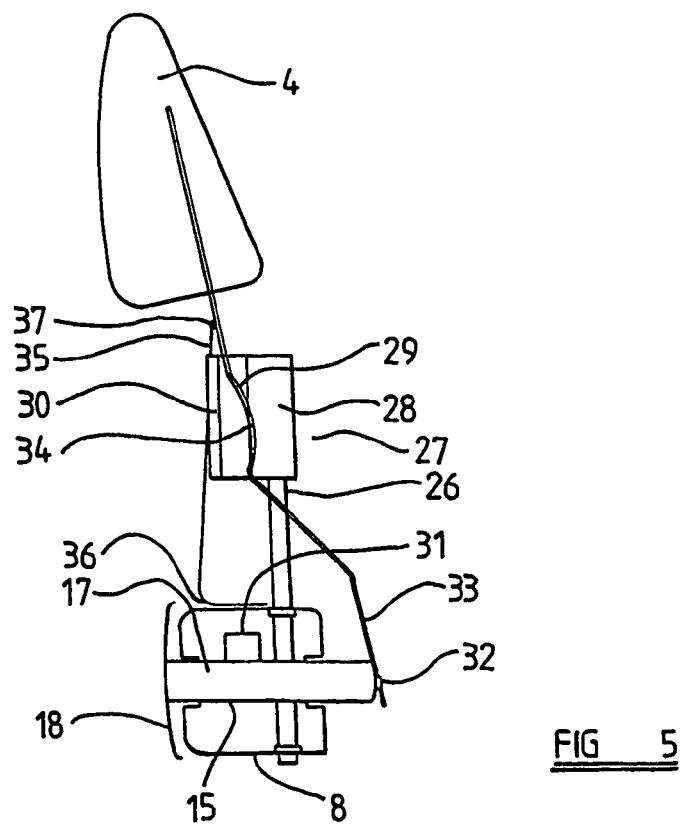
FIG. 5 is a view corresponding to FIG. 4 but illustrating the position occupied by the components of the headrest assembly after a rear impact.

Turning now to FIGS. 4 and 5, in a modified embodiment of the invention, the cross piece 8 of the frame 5 is provided with an upstanding support pin 26 which supports, at its upper end, a blocking element 27. The blocking element 27 includes a rear part 28, the forward face of the rear part having a recessed pivot surface 29 of generally concave configuration. Located in front of the rear part 28 is a stop element 30 which is fixed in position relative to the cross piece 8.

The cross piece 8 defines a guide passage 15 (again fast with the frame 5) which accommodates a drive element 17, the drive element 17 being connected, at its forwardmost end, to a pressure plate 18.

Present within the cross member 8 is a ratchet arrangement 31, illustrated schematically. The ratchet arrangement 31 is provided to engage serrations (not shown) provided on the drive element 17 to prevent the drive element 17 moving forwardly after the drive element 17 has been moved rearwardly in the event of a rear impact.

The rearmost end of the drive element 17 is provided with a connecting stud 32 having an aperture through which the lowermost part of a support element 33 is slidingly connected to the drive element 17. The support element 33 extends upwardly from its point of connection to the drive element 17, passing through the space defined between the rear part 28 of the blocking element 27 and the stop element 30. Part 34 of the support element 33 extends past the concave pivot surface 29, the part 34 being of corresponding convex form, with the convex part 34 being snugly received within the concavity of the concave pivot surface 29. The uppermost part of the support element 33 supports the headrest 4.

A biasing member in the form of a leaf spring 35 is provided, one part 36 of the leaf spring being mounted on the uppermost part of the cross piece 8, the other end 37 of the leaf spring engaging part of the support element 33 at a position above the blocking element 27.

The leaf spring 35 serves to bias the headrest 4 to a rearwardmost initial position, with the pressure plate 18 being located in a forward position.

Should a vehicle incorporating a seat having a headrest arrangement of the type shown in FIG. 4 be involved in a rear impact, a reactive force will be applied to the pressure 18 by the torso of the seat occupant thus moving the drive element 17 rearwardly through the guide passage 15.

As the drive element 17 moves rearwardly, so does the connection between the rearwardmost end of the drive element 17 and the lower part of the support element 33. The support element 30 is thus urged upwardly, such that its lower part slides through the aperture provided in the connecting stud 32. As a consequence of the engagement of the convex part 34 of the support element 33 with the concavity of the pivot surface 29 a pivoting motion is effected against the bias provided by the leaf spring 35. Thus the headrest 4 moves forwardly and slightly upwardly to the position shown in FIG. 5. Forward movement of the headrest 4 is limited by engagement of part of the support element 33 with the stop element 30.

This engagement of the support element 33 with the stop element 30 also prevents the headrest 4 from moving forwardly inadvertently should luggage from the rear part of the vehicle strike the headrest 4 in a frontal impact situation.

It is to be understood that the ratchet arrangement 31 will serve to retain the drive element 17 in the final position that it occupies, as shown in FIG. 5, thus preventing subsequent rearward movement of the headrest 4.

Figure 6:
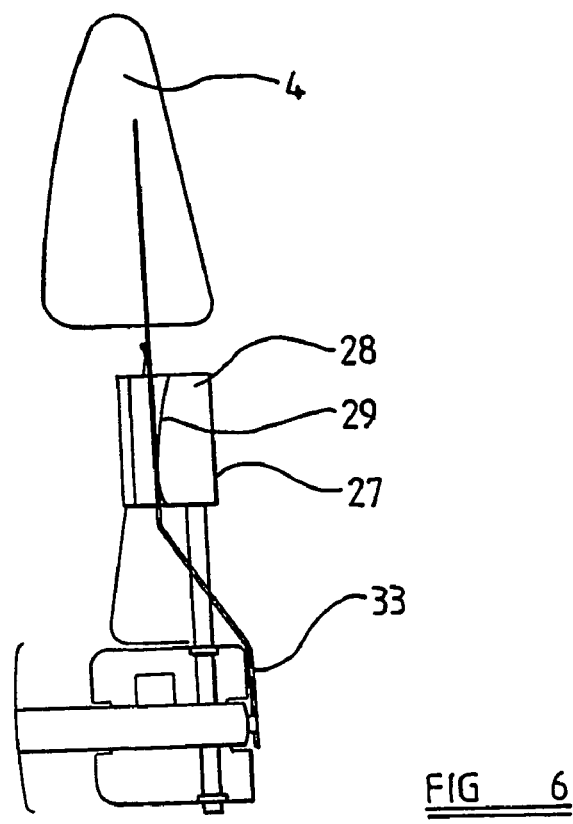
FIG. 6 is a view corresponding to FIG. 4 illustrating a further alternative embodiment of the invention.
Figure 7:
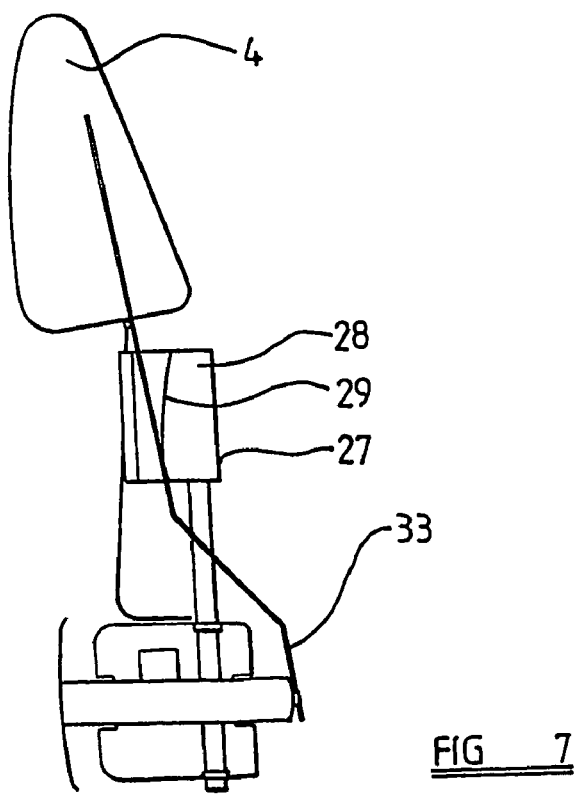
FIG. 7 is a view corresponding to FIG. 5 illustrating the embodiment of FIG. 6 in the position that it will occupy after a rear impact.

Turning now to FIGS. 6 and 7 of the accompanying drawings a further embodiment is illustrated which is very similar to the embodiment of FIGS. 4 and 5 save that the pivot surface 29 defined by the rear part 28 of the blocking element 27 is of convex form and the part of the support element 33 extending between the rear part 28 of the blocking element 27 and the stop element 30 is linear. It should thus be understood that when a headrest arrangement of the type shown in FIGS. 6 and 7 is actuated, the linear part of the support element 33 will effect a "rolling" pivotal action about the convex pivot surface 29, enabling the headrest 4 to move to a forward position as shown in FIG. 7.

It should also be appreciated that in each of the above described embodiments the headrest 4 is effectively supported above the uppermost part of the backrest 3 by virtue of the engagement between each guide element and each respective guide passage. It will therefore be seen that the arrangements do not require a pivot bearing to support the headrest whilst also permitting its pivotal movement.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A vehicle seat comprising a squab, a backrest and a headrest, the headrest being supported by a support element connected to a drive element, the drive element being connected to a pressure plate within the backrest, the drive element being guided for rearward movement by a guide including at least one linear guide passage extending in a direction substantially perpendicular to the backrest and coupled to a frame of the seat, the drive element being slidably arranged within the guide passage, wherein a pivot surface located adjacent the support element engages the support element such that on rearward movement of the pressure plate the drive element moves linearly within the guide passage and the support element engages the pivot surface to cause the headrest to pivot forwardly through an arcuate path about the pivot surface.

2. A vehicle seat according to claim 1, wherein a stop element is provided located in front of the support element to restrict forward movement of the headrest.

3. A vehicle seat according to claim 1 wherein a resilient biasing member is provided to bias the headrest to an initial position.

4. A vehicle seat according to claim 1 wherein the pivot surface is convex.

5. A vehicle seat according to claim 1 wherein the pivot surface is concave.

6. A seat according to claim 5, wherein the support element is provided with a convex part corresponding to the concave pivot surface, the convex part being received within the concavity of the convex pivot surface.

7. A vehicle seat according to claim 1 wherein the drive element and the support element are connected by a stud and aperture connection.

8. A vehicle seat according to claim 1 wherein the drive element and the support element are formed integrally.

9. A vehicle seat according to claim 8, wherein the drive element and the support element are all formed from a single metal bar.

10. A vehicle seat according to claim 1 wherein retention means are provided for preventing rearward movement of the headrest following a forward pivotal movement of the headrest.

11. A vehicle seat according to claim 10, wherein the retention means to prevent rearward movement comprise a ratchet arrangement co-operating with the drive element.

12. A vehicle seat according to claim 1 wherein at least one additional drive element connected to one additional support element is provided with coupled to the headrest.

* * * * *

UNITED STATES PATENT AND TRADEMARK OFFICE
CERTIFICATE OF CORRECTION

PATENT NO. : 7,344,190 B2  Page 1 of 1
APPLICATION NO. : 10/562983
DATED : March 18, 2008
INVENTOR(S) : Lennart Haglund, Lennart Simonsson and Alf Holgers It is certified that error appears in the above-identified patent and that said Letters Patent is hereby corrected as shown below:

On the Title Page Item -57-

In the Abstract, after "squab", please insert --a--.

In column 6, line 51, Claim 12, after "provided", please delete "with".

Signed and Sealed this

Eighth Day of July, 2008

JON W. DUDAS
*Director of the United States Patent and Trademark Office*